(12) United States Patent
Sokolov

(10) Patent No.: US 10,641,949 B2
(45) Date of Patent: May 5, 2020

(54) FLAT ILLUMINATION DEVICE HAVING EDGE LIGHTING

(71) Applicant: Yuriy Borisovich Sokolov, Fryazino (RU)

(72) Inventor: Yuriy Borisovich Sokolov, Fryazino (RU)

( * ) Notice: Subject to any disclaimer, the term of this patent is extended or adjusted under 35 U.S.C. 154(b) by 0 days.

(21) Appl. No.: 16/343,635

(22) PCT Filed: Apr. 18, 2018

(86) PCT No.: PCT/RU2018/000245
§ 371 (c)(1),
(2) Date: Apr. 19, 2019

(87) PCT Pub. No.: WO2018/236250
PCT Pub. Date: Dec. 27, 2018

(65) Prior Publication Data
US 2019/0293862 A1    Sep. 26, 2019

(30) Foreign Application Priority Data

Jun. 23, 2017  (RU) ................... 2017122195

(51) Int. Cl.
*G02B 6/00* (2006.01)
*F21V 8/00* (2006.01)
*F21V 7/00* (2006.01)

(52) U.S. Cl.
CPC ........... *G02B 6/0091* (2013.01); *F21V 7/00* (2013.01); *G02B 6/0081* (2013.01); *G02B 6/0085* (2013.01); *G02B 6/0088* (2013.01)

(58) Field of Classification Search
CPC .. G02B 6/0081; G02B 6/0083; G02B 6/0088; G02B 6/0091; G02B 6/0093
USPC ........................................ 362/612
See application file for complete search history.

(56) References Cited

U.S. PATENT DOCUMENTS

| 7,543,970 B2* | 6/2009 | Kiyohara ............. G02B 6/0031 |
| | | 362/561 |
| 8,727,595 B2* | 5/2014 | Lai ....................... G02B 6/0031 |
| | | 362/23.09 |
| 9,958,590 B2* | 5/2018 | Teragawa ............. G02B 6/0031 |
| 10,191,206 B2* | 1/2019 | Choi ....................... H05K 1/189 |
| 2005/0141244 A1* | 6/2005 | Hamada ............... G02B 6/0068 |
| | | 362/612 |

(Continued)

FOREIGN PATENT DOCUMENTS

| KR | 101340053 B1 | 12/2013 |
| KR | 101494640 B1 | 2/2015 |

(Continued)

*Primary Examiner* — Christopher M Raabe
(74) *Attorney, Agent, or Firm* — Bryant J. Keller; Kirton McConkie

(57) ABSTRACT

The solution relates to lighting engineering, namely to thin illumination devices having a lateral arrangement of LEDs, which are intended for use as immovably fixed ceiling and wall lights. The technical result of the claimed solution is increased structural strength and improved compactness on account of a monoblock design. The device comprises a housing formed by successively connected plastic profiles, a flat light guide, a U-shaped metallic LED board which is mounted in a cavity of a profile having an open cavity, and a power source arranged in a profile having a closed cavity.

6 Claims, 4 Drawing Sheets

(56) References Cited

U.S. PATENT DOCUMENTS

| | | | |
|---|---|---|---|
| 2008/0088763 A1* | 4/2008 | Toriyama | G02B 6/0091 349/58 |
| 2008/0180972 A1* | 7/2008 | Sakamoto | G02B 6/009 362/613 |
| 2009/0316064 A1* | 12/2009 | Kono | G02B 6/009 349/58 |
| 2010/0027255 A1 | 2/2010 | Chang et al. | |
| 2011/0176087 A1* | 7/2011 | Park | G02B 6/0091 349/63 |
| 2016/0370530 A1* | 12/2016 | Shimizu | G02B 6/0083 |
| 2019/0187362 A1* | 6/2019 | Lee | G02B 6/0068 |

FOREIGN PATENT DOCUMENTS

| | | |
|---|---|---|
| KR | 101604290 B1 | 3/2016 |
| RU | 76418 U1 | 9/2008 |
| RU | 115441 U1 | 4/2012 |
| RU | 2565419 C1 | 10/2015 |

* cited by examiner

FLAT ILLUMINATION DEVICE HAVING EDGE LIGHTING

FIELD

The described systems and methods relate to lighting engineering, particularly to LED edge lighting units that are intended for use as ceiling and wall-mounted fixed lights.

BACKGROUND

Currently, it is known that there are constructively multiple suspended, built-in and fixed-on light sources to be conditionally divided into several groups:
reflected-surface lighting units,
gap lighting units, and
edge lighting units.

Edge-lit units have a number of advantages (light weight, low cost, uniform illumination, substantially smaller light thickness etc.). Today, such lights have their thickness reduced down to 10 mm and less. But all those lights are furnished with remote large-size power supplies positioned separately (beyond a light) and designed so that it makes them very unhandy. Besides, it can be necessary to tackle different tasks for reducing labor output and cost ratio due to severe competition in the market.

A known LED lighting unit contains a light guide panel made of glass or optical plastic, and LEDs disposed close by an end surface (patent RU2565419, F21V 7/00, publication date: Oct. 20, 2015). The known solution is featured with its large thickness, weight and value.

Patent KR101604290, IPC F21V15/01 published on Mar. 17, 2016 and patent KR101340053, IPC F01B1/00 published on Dec. 10, 2013 are currently in use and contain the following patent-claim common features: a planar light guide, light-emitting diodes fitted on a card installed close by an end face of a light guide, a frame fabricated from tandem-connected pressed aluminum items having a transverse profile that is designed to have an open cavity for holding a planar light guide and a cavity for placing an LED circuit card.

A lighting unit made under patent KR101494640, IPC F21V 8/00 published on Feb. 23, 2015 is the closest known equivalent applicable as a prior art containing a planar light guide, light-emitting diodes fitted on a card installed close by an end face of a light guide, a frame fabricated from tandem-connected pressed aluminum items having a profile that is designed to have an open cavity for installing an LED circuit card; a connecting unit comprising an angle piece and cover that have a sliding joint with an inner frame wall surface and integrated threaded joints. Additionally, this unit is furnished with a power supply mounted beyond its housing due to the excess dimensions to cause problems for unit installation or removal, it has high material output ratio and no simple or effective non-insulated power supplies can be used.

Such prototypes additionally suffer from such effects as distortion since they are significantly affected by thermal loads, especially in the event of excess light emission power.

The technical result of the claimed solution is hardening its frame and improving the compaction at the expense of the monoblock design.

SUMMARY

This invention can be characterized with a set of dominant features, as follows:

An edge-lit flat panel unit containing a planar light guide made of glass or optical plastic; an LED card installed close by an end surface of a light guide; a frame fabricated from tandem-connected extrusion profiles designed to have an open cavity for holding a planar light guide and for placing an LED circuit card; a frame profile connecting unit comprising an angle piece and a cover characterized in that the frame profile and unit items are made of dielectric plastic; a frame is equipped with at least one profile item designed to have an open cavity for holding a power supply and/or LED control circuit; an LED card is a U-shaped component with a middle and side sections sited along cavity walls to be optionally reinforced and thermally optimized, wherein side sections of said U-shaped LED card make up a light reflector surface and limiters are located within the LED area, thereby bringing a light guide end to the position not closer than 0.1 mm of light emitting-diodes.

A special enclosed cavity made in a plastic profile is a preferred embodiment for a frame profile wherein a power supply is to be installed, since it will insulate a power supply and/or an LED control circuit.

A plug is pressed in the profile end to be used as a threaded or glue joint to which a frame profile unit is to be connected.

The preferred embodiment constitutes use of a commercial line non-insulated light unit power supply. A light-sized high-voltage power supply may be used, as well.

Since LEDs with the efficiency exceeding 80 lm/W are currently available in the market, the last energy intake standards drop down and 24 W lines may be used for feeding any 600×600 mm ceiling light to have high luminous flux (more than 3500 lm).

To remove parasitic illumination from a light guide surface, a planar light guard mount profile is furnished with some projections that make it possible jointly with an LED card reflector to prevent penetration of parasitic illumination to a light guide surface.

An LED card is designed so that it is not a problem to fabricate a light unit, particularly to install a planar light guide, as well as to optimize the distance between an edge of a planar light guide and LEDs. For obtaining the said advantage, some limiters with the height exceeding that of a light-emitting diode by 0.1 mm are secured on an LED card surface. Alternatively, some individually attached components can be used as limiters on an LED card.

DETAILED DESCRIPTION

Figure 1:
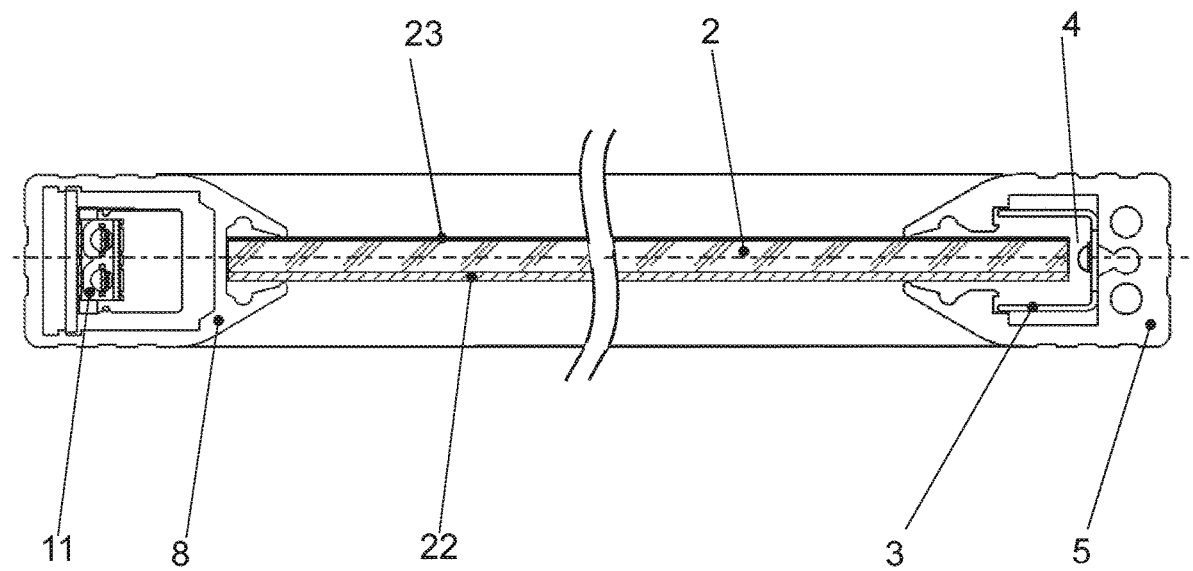
FIG. 1—unit axial section,
FIGS. 2-3D image of a frame profile intended for installing an LED card and for holding a planar light guide, removed,
FIG. 3—frame profile and LED card section,
FIGS. 4—3D image of a frame profile section intended for installing a power supply and for holding a planar light guide,
FIG. 5—frame profile and power supply section,
FIG. 6—frame profile connection unit, and
FIGS. 7—3D image of light unit arrangement
Figure 2:
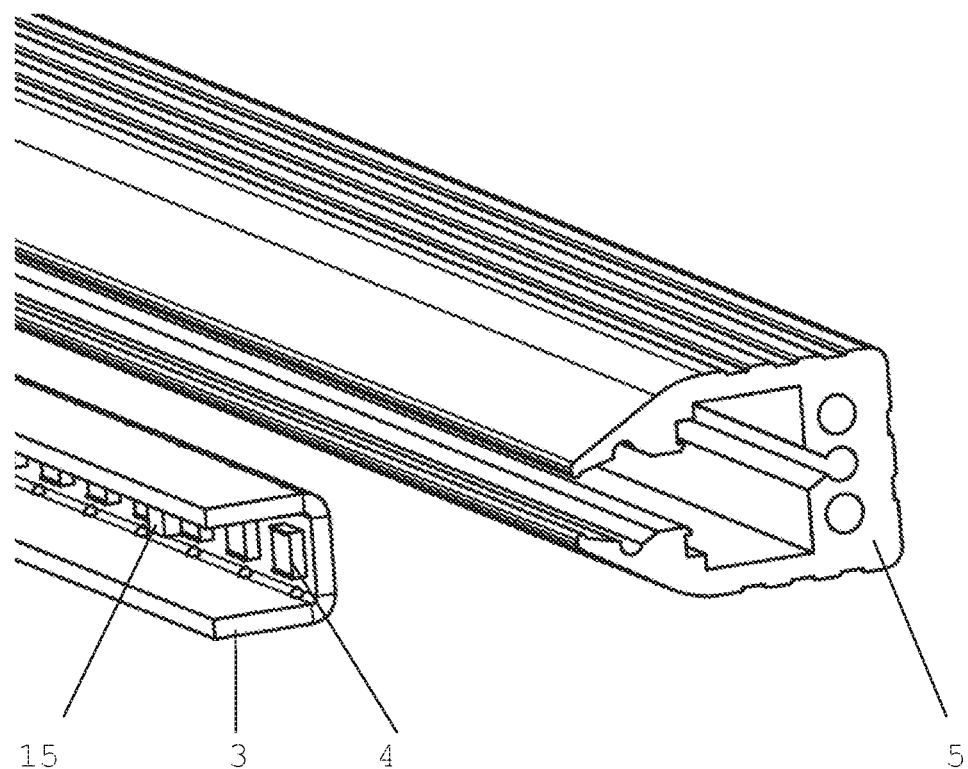
Figure 3:
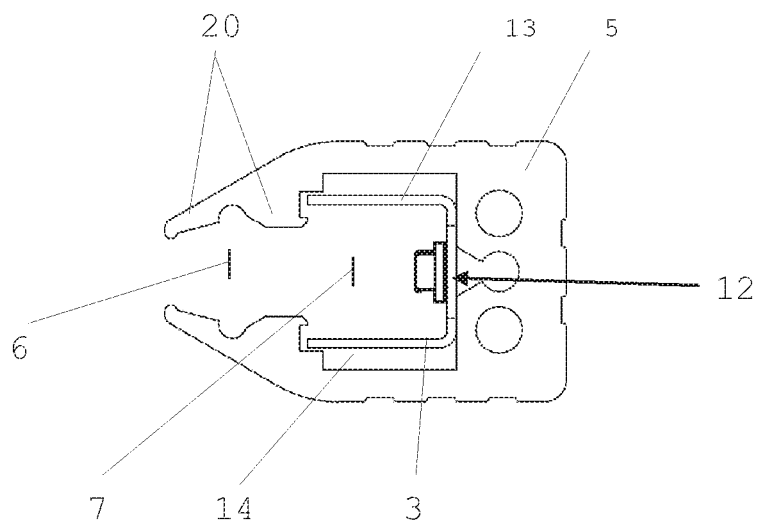
Figure 4:
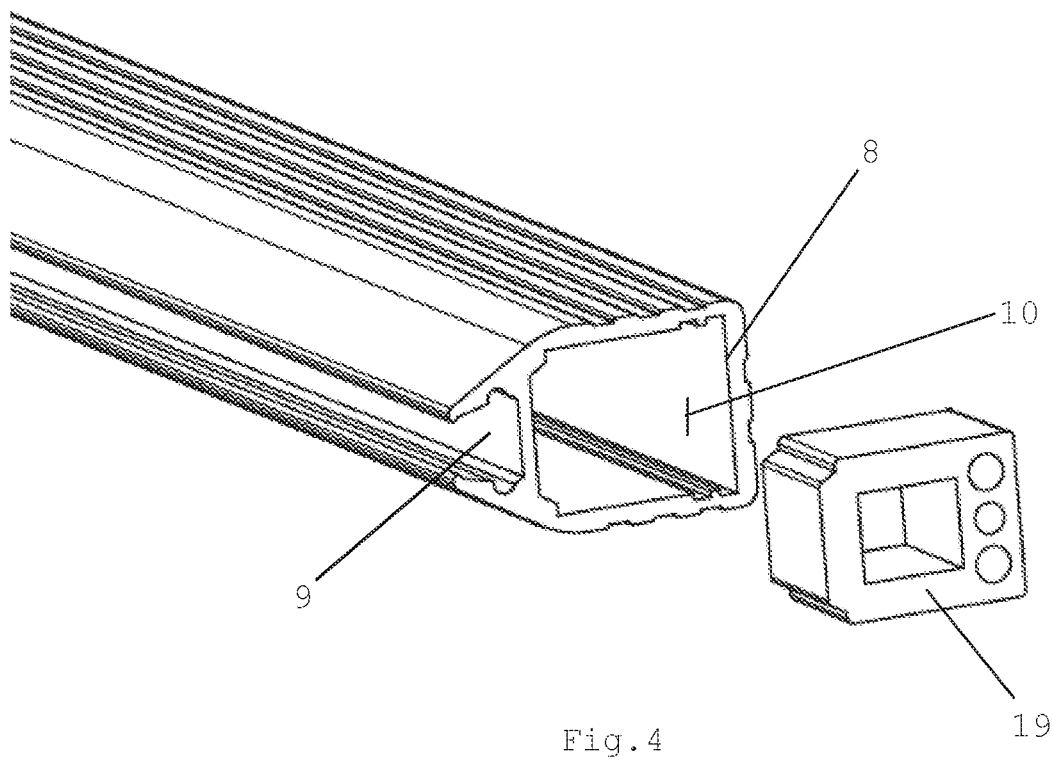
Figure 5:
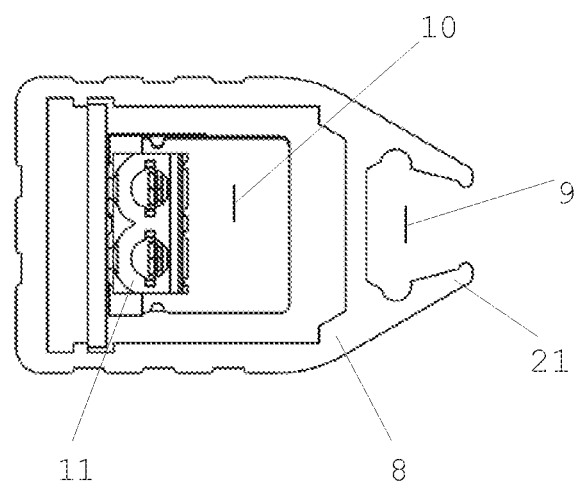
Figure 6:
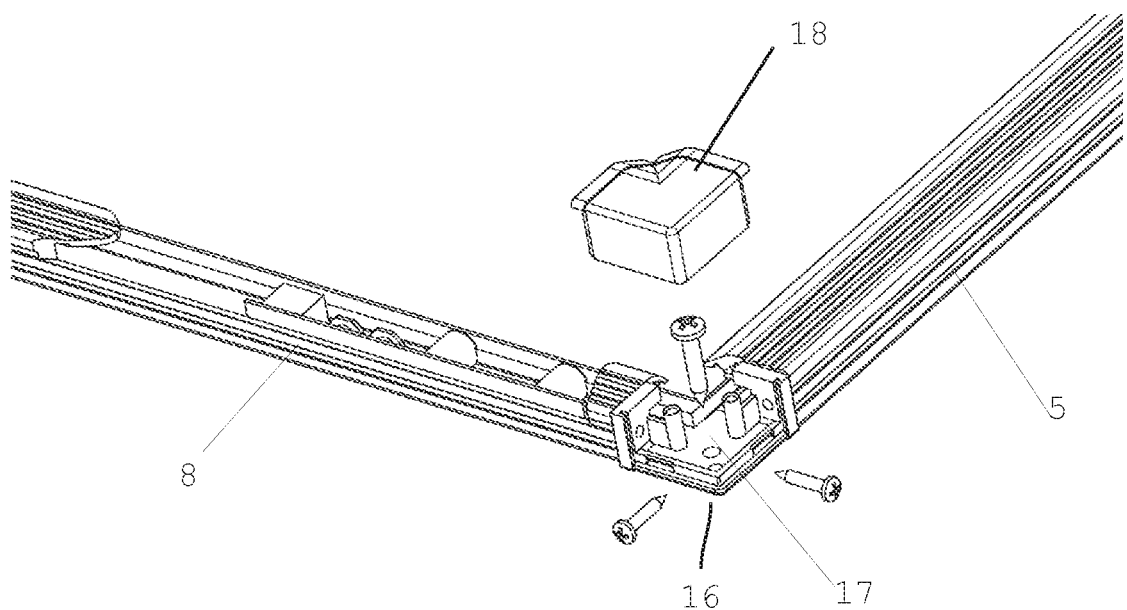
Figure 7:
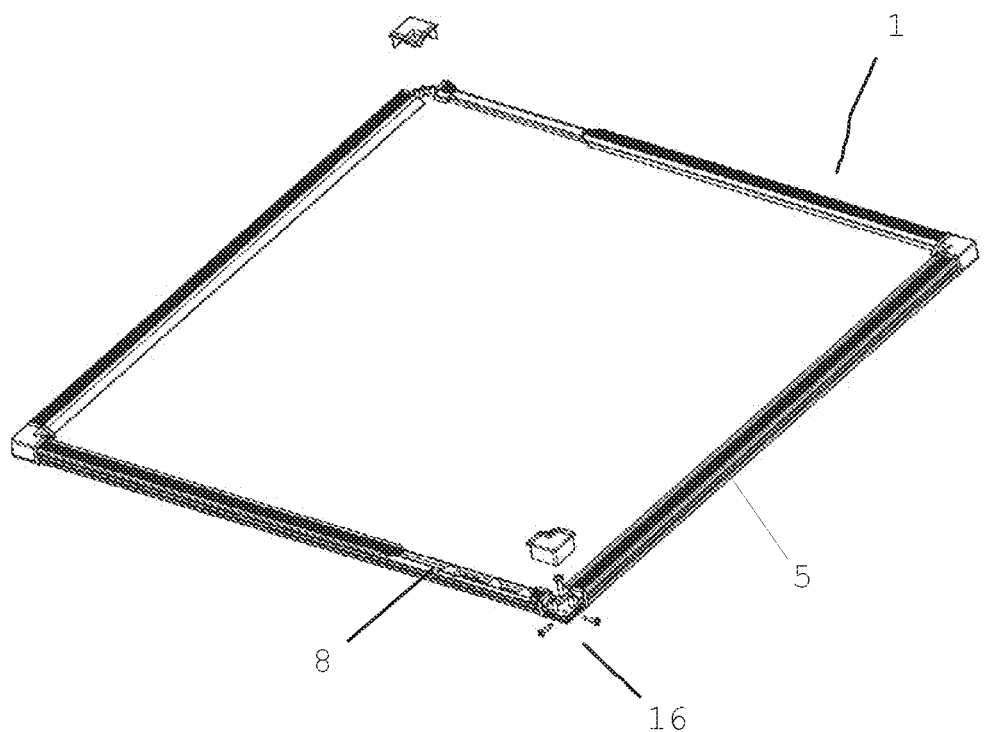

An edge-lit flat panel unit contains planar light guide 2 made of glass or optical plastic; card 3 of light-emitting diodes 4 located close by an end surface of light guide 2; a frame fabricated from tandem-connected extrusion profile 5 designed to have open cavity 6 for holding planar light guide 2 and cavity 7 for placing printed-circuit card 3 and extrusion profile 8 designed to have open cavity 9 for holding planar light guide 2 and enclosed cavity 10 for placing power supply 11 that feeds LEDs or light control circuitry; unit 16 for connecting profiles 5 and 8 of frame 1 comprising angle piece 17 and cover 18.

Frame profiles 5 and 8 are made of plastic.

Frame profile 5 has cavity 6 for holding planar light guide 2 and cavity 7 for placing LED card 3.

At least one of the frame profiles has cavity 9 for holding planar light guide 2 and cavity 10 for placing power supply 11 and/or for placing an LED control card.

LED card 3 has a U-shaped profile, middle section 12, and side sections 13 and 14 disposed along walls of cavity 7 of profile 5 and installed to reinforce the profile, wherein middle section 12 of card 3 is thermally contacted with the profile and takes away surplus heat from LEDs 4.

Site sections 13 and 14 of U-shaped LED card 3 constitute a target LED light reflector. Additionally, LED card 3 is furnished with limiters 15 for making the end of light guide 2 bring to the position not closer than 0.1 mm to LEDs 4. Printed circuit card SMT components can be used as limiters for removing any risk of failure of LEDs 4.

The frame form is not limited by four profile items but a four-element profile frame is advantageous. There are cards 3 with LEDs 4 in the first pair of the opposite profiles and power supply 11 and/or light control circuits in the second pair of profiles. Profiles 5 and 8 are joined to each other with unit 16 comprising angle piece 17, cover 18, and plug 19 pressed in the end of profile 8 of the frame.

Needless to say that U-shaped card 3 can perform several functions: it enforces profiles 5, it can be used as a heat sink and it can be used as an optical element that directs LED 4 light to the end of light guide 2.

This matter is of a great importance since all live parts are totally protected by dielectric plastic, thus making is possible to feed LEDs from a small-sized high-voltage power supply featured with rather high efficiency; additionally they are lowly valued against isolated power supplies applied in known prototypes and used in shock hazard environments.

It is also helpful to note that plastic grips 20 of profiles are capable to remove any parasitic illumination around the perimeter of a light-emitting surface coming in contact with a surface of safety glass 22 and reflector 23.

What is claimed:

1. An edge-lit flat panel unit comprising:
    a planar light guide having multiple end surfaces and comprising an optical plate of at least one of glass and plastic;
    an LED card mounted on at least one of the end surfaces of the planar light guide; and
    multiple extruded profiles that are connected in series and that are coupled together with connection elements to form a frame,
    wherein each of the extruded profiles defines a first open cavity that receives one of the end surfaces of the planar light guide,
    wherein a first of the extruded profiles defines a second open cavity that comprises a printed circuit board comprising an LED, the LED being configured to deliver light to one of the end surfaces of the planar light guide,
    wherein a second of the extruded profiles defines a closed cavity comprising at least one of: (a) a power supply of the LED and (b) a light control circuit of the LED,
    wherein the extruded profiles and the connection elements comprise an insulating plastic;
    wherein the LED card has a U-shaped profile comprising a middle section and lateral sections,
    wherein the lateral sections are installed along walls of the second cavity to provide reinforcement and heat exchange to the first of the extruded profiles that defines the second open cavity and that houses the LED card,
    wherein the lateral sections of the LED card comprise a light reflective material, and
    wherein the LED card comprises a limiter that is configured to space the planar light guide not closer than 0.1 mm of an LED of the LED card.

2. The edge-lit flat panel unit of claim 1, wherein an end of at least one of the extruded profiles is fitted with an end plug that is attached to at least one of the connection elements to connect two of the extruded profiles.

3. The edge-lit flat panel unit of claim 1, wherein the LED power supply is not isolated from a network.

4. The edge-lit flat panel unit of claim 1, wherein a portion of at least one of the extruded profiles comprises a projection that contacts a face of the planar light guide to prevent parasitic illumination.

5. The edge-lit flat panel unit of claim 1, wherein a first and a second wall of the first open cavity each comprise a protrusion that is configured to prevent parasitic illumination.

6. The edge-lit flat panel unit of claim 1, wherein the closed cavity comprises the power supply of the LED.

* * * * *